United States Patent Office 3,389,130
Patented June 18, 1968

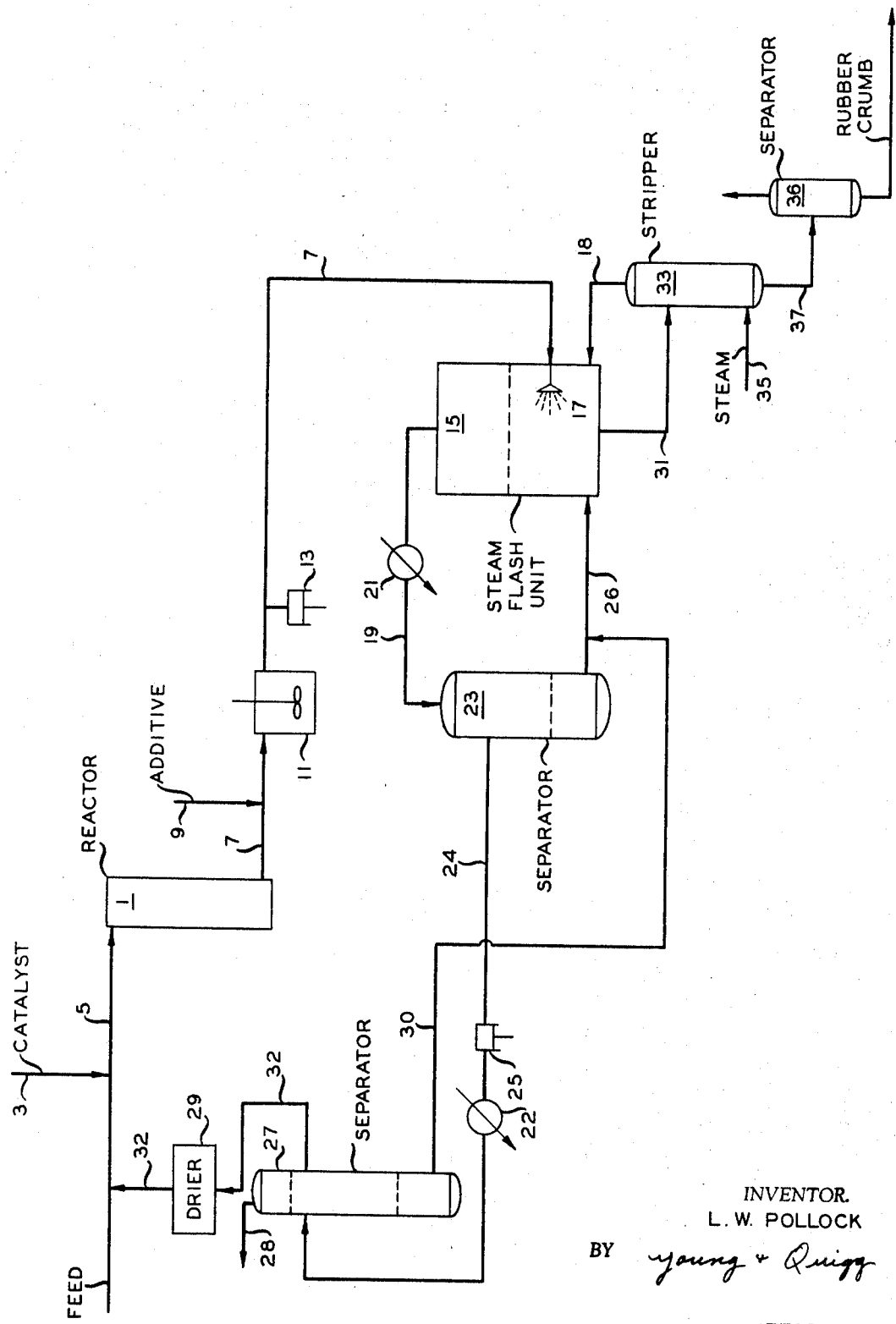

3,389,130
BULK POLYMERIZATION OF BUTADIENE AND RECOVERY OF PRODUCT
Lyle W. Pollock, Bartlesville, Okla., assignor to Phillips Petroleum Company, a corporation of Delaware
Filed Nov. 16, 1964, Ser. No. 411,465
8 Claims. (Cl. 260—94.3)

ABSTRACT OF THE DISCLOSURE

A process and apparatus for preparing polymers of conjugated dienes in which a conjugated diene is polymerized by contacting the said diene in the absence of a diluent with a suitable catalyst. Concentrated polymer solution is withdrawn from the reaction zone, subjected to rapidly pulsating pressure and sparged into a flash zone thereby breaking apart the concentrated polymer solution into discrete particles and flashing the unreacted diene from said polymer solution. The catalyst is inactivated by steam in the flash zone and polymer is recovered in the form of substantially uniform crumb.

---

This invention relates to a process and to apparatus for the production of solid polymers of conjugated dienes. In one aspect, it relates to a process in which a conjugated diene is polymerized with certain specific catalysts in the absence of a diluent, and a rubbery or resinous polymer in the shape of a fine and uniform crumb substantially free of contamination is recovered as the product of the process. In another aspect it relates to the termination of the polymerization reaction when the desired conversion has been reached by the employment of a novel short-stopping method. In yet another aspect it relates to a modified rubbery polymer product which resists the destructive effects of oxidation, heat, and flex cracking.

In recent years, a large amount of research work has been conducted with the view of producing improved rubbery polymers. Great advances have been made quite recently in this field as the result of the discovery of new catalyst systems. The polymerization processes employing these novel catalyst systems are generally conducted in the presence of an inert diluent which makes it necessary to separate the rubbery polymer from the diluent upon completion of the polymerization. Since these processes require the handling of polymer solutions, large amounts of diluent must be used in order that the viscosity of the solutions will not be so high as to render their handling difficult. It is also necessary that the diluents used in these polymerization processes be of an extremely high purity. Since most of the diluents are comparatively expensive hydrocarbons, it is important that the diluent be recovered after its separation from the polymer. It is also highly important that substantially all of the diluent be removed from the rubbery polymer products in order that the excellent physical properties of the polymer may be realized to their fullest extent. I have developed a process which is an improvement over these processes of the prior art in that I have developed a method for handling the highly viscous rubbery solution without the need of a diluent, and therefore I have eliminated the problems discussed hereinabove.

It is, therefore, an object of this invention to provide a novel process and apparatus for the preparation and recovery of rubbery polymers of conjugated dienes.

Another object of the invention is to provide a process and apparatus in which a conjugated diene is polymerized with certain specific catalyst systems in the absence of a doluent whereby a fine uniform rubbery crumb polymer, substantially free of contamination, is recovered as the product of the process.

Yet another object of the invention is to provide an improved process and apparatus for recovering the rubbery polymer from a highly viscous solution in a fine uniform crumb form.

A further object of the invention is to provide a method and apparatus for effectively short-stopping the polymerization with steam.

A still further object of the invention is to carry out the polymerization in the absence of a diluent.

Other objects and many of the attendant advantages of this invention will be readily appreciated as the same becomes better understood by reference to the following detailed description which is considered in connection with the accompanying drawing wherein:

A drawing illustrating my invention in schematic form forms a part of my application.

Bulk polymerization of monomers to rubbery polymers such as cis-polybutadiene rubber produces viscous non-Newtonian fluid that is difficult to mix. One of the mixing problems is related to obtaining intimate contact of the reaction solution with a short-stopping agent in order to be able to control the molecular weight of the polymer.

The instant invention is concerned with a process in which conjugated dienes are polymerized in the absence of a diluent, and a solid uniform crumb rubbery polymer, substantially free of contamination, is recovered as the product of the process. Broadly speaking, the process comprises the steps of polymerizing a monomeric material comprising a conjugated diene with a catalyst comprising an organo metal or a complex metal hydride in the absence of a diluent, adding an antioxidant to the viscous polymer effluent when it leaves the reactor, pulsing this concentrated highly viscous effluent through a sparger into a steam flash unit in order to cause a rapid short-stop of the reaction. The finely divided precipitated rubber crumb is then steam stripped to remove last traces of butadiene. Recovered butadiene is dried and returned to the polymerization reactor.

The monomeric material which is polymerized to solid polymers by the process of this invention comprises conjugated dienes containing 4–10, inclusive, carbon atoms. Examples of conjugated dienes which can be used include: 1,3-butadiene; 2-methyl-1,3-butadiene (isoprene); 2,3-dimethyl-1,3-butadiene; 1,3-pentadiene; 2-methyl-1,3-pentadiene; 2,3 - dimethyl - 1,3 - pentadiene; 3-methyl-1,3-pentadiene; 2-phenylbutadiene, and the like whenever the polymer is soluble in the monomeric material.

This invention is applicable to the polymerization of the above-identified conjugated dienes either alone or in admixture with each other and/or with one or more compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes, such as butene-2, pentene-2, hexene-2, heptene-2, 2-methylbutene-1, 2-methylhexene-1, 2-methylheptene-1, and the like. Other olefins which can be used include di- and polyolefins, such as 1,5-hexadiene, 1,4-pentadiene, and 1,4,7-octatriene, and cyclic olefins such as cyclohexene. Other examples of compounds containing an active $CH_2=C<$ which are copolymerizable with one or more of the conjugated dienes are styrene, acrilonitrile, methacrilonitrile, methacrylate, methylmethacrylate, methylacetate, vinylacetate, vinylchloride, vinylidene bromide, 2-methyl-5-vinyl pyridine, 2-vinylpyridine, 3-vinylpyridine, 3-vinyltoluene, 1-vinylnaphthalene, 2-vinylnaphthalene, 4-vinyltoluene, and the like.

The catalyst used in the polymerization stage of the process of this invention can be broadly defined as comprising a member selected from the group consisting of organometals and complex metal hydrides. The organometals and the complex metal hydrides are often used in admixture with certain metal compounds as will become apparent hereafter from the description of catalyst systems containing two components.

One particularly effective catalyst for use in the polymerization comprises an organometal compound corresponding to the formula $R(Li)_x$, wherein R is a hydrocarbon radical selected from the group consisting of aliphatic, cycloaliphatic and aromatic radicals and combinations of these radicals, and $x$ is an integer from 1 to 4, inclusive. The R group has a valence equal to the integer $x$ and preferably contains from 1 to 20, inclusive, carbon atoms, although it is within the scope of the invention to use higher molecular weight compounds. Examples of organolithium compounds which can be used include methyllithium,
isopropyllithium,
n-butyllithium,
tert-octyllithium,
n-decyllithium,
phenyllithium,
naphthyllithium,
4-butyl-phenyllithium,
p-tolyllithium,
4-phenyl-butyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithiobutene-2,1,8-dilithio-3-decene,
1,4-dilithiobenzene,
1,5-dilithionaphthalene,
1,2-dilithio-1,2-diphenylethane,
1,5-dilithioanthracene,
1,3-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,4,6-tetralithiocyclohexane,
1,2,3,5-tetralithio-4-hexylanthracene, and the like.

When employing a two-component catalyst system to polymerize conjugated dienes according to this invention, one component is an organometal or a complex metal hydride and the second component is a halide of certain Group IV to VI and VIII metals (Periodic Chart of the Elements, Fundamental Chemistry, 2nd edition, by H. G. Deming). The organometal compounds referred to include, without limitation, alkyl, cycloalkyl, aryl, alkaryl, aralkyl, alkylcycloalkyl, or cycloalkylalkyl compounds of di-, tri- or tetravalent metals, particularly Group I, II, III or IVB metals, such as sodium, potassium, lithium, rubidium, cesium, magnesium, cadmium, mercury, zinc, barium, lead, tin, aluminum, boron, gallium, indium, and beryllium. The organo groups can be quite large compounds being applicable which have 15 or more carbon atoms in each group and 40 or more carbon atoms in the molecule. These organometals can be advantageously represented by the general formula $R_nM$ wherein R is one of the aforementioned organo radicals, M is a Group I, II, III or IVB metal, and $n$ is equal to the valence of the metal M. Examples of such organometal compounds include: trimethylaluminum, triethylaluminum, triisobutylaluminum, tri-n-butylaluminum, tri-n-hexylaluminum, tri-n-octylaluminum, tri-n-dodecylaluminum, triphenylaluminum, triphenylgallium, diphenylberyllium, dicyclohexylberyllium, diethylzinc, tetraethyllead, tetraphenyllead, tetraethyltin, and the like.

The complex metal hydrides which can be employed as catalyst components can be represented by the general formula $M'M''H_4$ wherein M' is an alkali metal and M'' is aluminum or boron. Specific examples of suitable hydrides are lithium aluminum hydride, sodium aluminum hydride, potassium aluminum hydride, lithium borohydride, sodium borohydride, and the like.

As previously mentioned, the two-component catalyst systems used in the process of this invention include halides of certain metals of Group IV to VI and VIII of the periodic system in addition to the above described organometals and complex metal hydrides. More specifically, halides of titanium, zirconium, vanadium, niobium, molybdenum and cobalt can be advantageously employed. Of the metal halides, it is preferred to use the chlorides and iodides in the catalyst system. Specific examples of suitable metal halides include titanium tetrachloride, titanium tetraiodide, zirconium tetrachloride, vanadium tetrachloride, niobium triiodide, molybdenum pentachloride and cobaltous iodide.

Examples of preferred catalyst systems in accordance with the foregoing disclosure are as follows:

(a) Aluminum trialkyls, e.g., triethylaluminum or triisobutylaluminum, and titanium tetrachloride or titanium tetraiodide;

(b) Molybdenum pentachloride and an organometal compound such as diethylzinc or diisobutylmercury;

(c) A complex metal hydride, such as lithium aluminum hydride, and a Group IV metal halide, such as titanium tetraiodide or titanium tetrachloride;

(d) A complex metal hydride, such as lithium aluminum hydride, and niobium triiodide; and (e) A complex metal hydride, such as lithium aluminum hydride and a cobaltous halide, such as cobaltous iodide.

While the catalyst described hereinabove has been indicated to be a two-component catalyst system, it is to be understood that the catalyst can include mixtures of the various catalyst components. For example, a particularly suitable catalyst for use in the polymerization has been found to be one which includes an organometal, such as a trialkylaluminum, titanium tetraiodide and titanium tetrachloride.

The polymerization stage of the process of this invention can be carried out at any temperature within the range of about −110 to 300° F., but it is preferred to operate in the range of −5 to 180° F. The polymerization reaction can be carried out under autogenous pressures. It is usually desirable to operate at pressures sufficient to maintain the monomeric material substantially in the liquid phase. The pressure will thus depend on the particular material being polymerized and the temperature at which polymerization is conducted. However, higher pressures can be employed if desired, these pressures being obtained by some such suitable method as the pressurization of a reactor with a gas which is inert with respect to the polymerization reaction. The polymerization according to this invention is carried out in the liquid phase.

The amount of the catalyst which is used in the polymerization stage of the process of this invention can vary over a rather wide range. When utilizing an organolithium compound, at least 0.05 part by weight of this material per 100 parts by weight of the monomer is usually employed. A preferred catalyst level is from 0.1 to 2 parts by weight of the organolithium compound per 100 parts by weight of monomers charged to the polymerization zone. When utilizing a catalyst comprising an organometal compound, the amount of the organometal used in the catalyst composition is usually in the range of 1.0 to 15 mols per mol of the metal halide. However, a preferred mol ratio is from 2.5:1 to 8:1 of the organometal compound to a metal halide. The concentration of the total catalyst composition, i.e., organometal and metal halide, is usually in the range of 0.05 to 10 weight percent, preferably in the range of 0.05 to 5 weight percent, based on the total amount of monomer charged to the polymerization zone. When a catalyst comprising a complex metal hydride and a metal halide is employed in the polymerization, the amount of complex metal hydride used in the catalyst composition is usually in the range of 0.5 to 6 mols per mol of metal halide. However, a preferred ratio is from 1.3 to 3.0 mols of the complex metal hydride per mol of metal halide. The amount of this latter catalyst used in this polymerization is usually in the range of about 0.10 weight percent to 10 weight percent or higher, preferably in the range of 0.25 weight percent to 7 weight percent, based on the total amount of monomer charged to the polymerization zone.

Upon completion of the polymerization stage, which generally requires 5 to 200 minutes and preferably 10–100 minutes, the polymer solution, normally containing from 10 to 50 percent polymer, is preferably admixed with a suitable stabilizing material. Conventional antioxidants and stabilizers which are usually used with natural or synthetic rubbers, such as phenyl-beta naphthylamine can be used.

After the addition of a stabilizer, the highly viscous polymer solution is pulsed through a sparger into a steam flash unit. The pulsing of the rubber concentrate into the steam flash unit provides a breakup of the large mass of polymer concentrate to form discrete particles of rubber crumb. In the steam flash unit the butadiene is rapidly flashed from the crumb, thus removing the reactant and short-stopping the reaction. In addition, steam will diffuse into the rubber crumb and kill any active catalyst therein. The antioxidant which has been added prior to passing the solution into the steam will short-stop part of the polymerization reaction; however, because of the high viscosity of the solution it will not be mixed adequately to do an effective and thorough job of short-stopping all the polymerization. The slurry of polymer in the water is recovered from the steam stripper by means of a suitable conduit and the polymer is separated from the water and dried in conventional equipment.

A better understanding of the invention can be obtained by referring to the drawing which is a flow diagram illustrating the several stages of the present process. While the process will be described with relation to the polymerization of butadiene with a specific catalyst system, it is, of course, evident from the foregoing disclosure that it is not intended to so limit the invention. As shown in the drawing, butadiene is charged to an annular reactor 1 through line 5 and the catalyst components, namely triisobutylaluminum and titanium tetraiodide (having been premixed), are added to the butadiene feed through line 3. In the reactor 1 polymerization occurs at a temperature of about 86° F., and the polymerization is allowed to continue until about 30 percent of the total butadiene present is converted to rubbery polymer. The effluent is then withdrawn from the polymerization zone through conduit 7. Any desired additive such as an antioxidant can be added to conduit 7 through conduit 9 and mixed with the polymer solution in mixer 11. A pulse producing device 13 adapted so as to produce a pressure wave in the direction of flow of the effluent through conduit 7 is connected with line 7 between the reactor and the steam flash unit 15, preferably in close proximity to a sparger 17 which is positioned in unit 15. The sparger and unit 13 can be made integral with one another.

A pulsation producing device described in Patent 2,913,-344 would be suitable for use in my process. The pulsation unit 13 provides a continuous series of pressure waves travelling in the same direction as the movement of the highly viscous effluent towards a steam flash unit 15. The unit 15 is supplied with steam through line 18 at a temperature of 233° F. and a pressure of 18 p.s.i.a., to cause the vaporization of the unreacted butadiene which is removed via conduit 19, passed through a condenser 21 into liquid separator 23 where the butadiene vapor is passed via line 24 through a compressor 25, a condenser 22 into a liquid separator 27. The liquid butadiene is passed vial line 32 through a drier 29 and back to the butadiene feed conduit 5. Any water in separator 27 is passed via line 30 back to unit 15. Any condensed water in separator 23 is returned to the steam flash unit 15 through line 26. Any volatile matter present in separator 27 passes through vent 28. The rubbery polymer is recovered from the steam flash unit 15 as a suspension in water and passed through line 31 to a steam stripper unit 33. Any unreacted butadiene still present is removed in the steam stripper unit 33 to which steam is supplied via conduit 35. The steam and unreacted butadiene are moved from the polymer and passed to the steam flash unit 15 via line 18. The polymer is removed from the system via line 37 from the stripper 33, passed through suitable liquid separator means 36 from which the rubber is removed as a fine uniform crumb and subsequently dried in conventional equipment.

A more comprehensive understanding of the invention can be obtained by referring to the following illustrative example which is not intended, however, to be unduly limitative of the invention.

EXAMPLE

A run is made in accordance with the process of this invention in which butadiene is polymerized in the presence of triisobutylaluminum and titanium tetraiodide. A fine uniform rubbery crumb polymer, substantially free of contamination, is recovered as the product of the process. The triisobutylaluminum and the titanium tetraiodide are dispersed in the butadiene and charged to an annular type reactor. The recipe for this run is as follows:

| | Parts by weight |
|---|---|
| Butadiene | 100 |
| Triisobutylaluminum | 0.60 |
| Titanium tetraiodide | 0.48 |

The initiation temperature for the polymerization is 4° F. while the maximum temperature reached during the run is 45° F. The major portion of the run is carried out at a temperature of 20° F. for a period of approximately 30 minutes. At the time the run is terminated, the conversion is 30 percent. At the end of this time, the reaction mixture is passed through conduit 7 from the reactor into the steam flash unit which inactivates the catalyst. By connecting a pulsation unit 13 which is sufficient to maintain the throughput of the reactor at a pulse frequency of 50 to 10,000 cycles per minute and preferably 200 cycles per minute, to the conduit 7 between the reactor and the steam flash unit and by passing the mixture through sparger 17, having orifices of from ⅛ to ⅜ inch in diameter, it is possible to break up the high mass concentration of the rubbery solution and to form discreet particles of rubber crumb ⅛ to ½ inch in diameter and from 1⅛ to 2¼ inches in length in the steam stripping unit. The velocity of the rubbery solution leaving the sparger varies from 1 to 10 feet per second. The steam flash unit is operated at a temperature of 150° F. and 25 p.s.i.g. pressure. The unreacted butadiene is flashed through the top of unit 15 and the rubber crumb is removed from the bottom of the steam flash unit, purified, and dried through conventional apparatus.

In summary, it would be evident to those skilled in the art that the heretofore difficulty in short-stopping a highly viscous polymerizate with water has been obviated by the process of my teaching which employs a pulsing means and a sparger to break up the high concentration of solids in combination with steam whereby the unreacted monomer is caused to be driven off and the condensed steam gets in between the discreet particles of the rubber crumb to kill the catalyst and cause the reaction to stop. The addition of the sparger and pulsing device provide a valuable contribution to producing a finer and more uniform rubber crumb on which last traces of butadiene can be readily removed than was possible with the processes heretofore employed.

It will be evident to those skilled in the art that many variations and modifications can be practiced upon consideration of the foregoing disclosure. Such variations and modifications are believed to be within the spirit and scope of the present invention.

I claim:

1. In a process for preparing polymers of conjugated dienes in which a conjugated diene is polymerized in a reaction zone wherein the diluent is primarily diene monomer, said process comprising the steps of contacting the said diene with a catalyst comprising a member selected from the group consisting of metal hydrides and organometals in a reaction zone, the improvement which comprises withdrawing concentrated highly viscous polymer solution containing from 10–50 percent polymer from the reaction zone, subjecting said concentrated polymer solution to a rapidly pulsating pressure after it leaves said reaction zone; sparging the said polymer solution into a steam flash zone thereby breaking apart the concentrated solution into discrete particles; said rapidly pulsating pressure being at a frequency sufficient to reduce the size of particles formed in said flash zone below that which would result in the absence of said rapidly pulsating pressure; flashing the unreacted diene from said polymer solution in the presence of steam thereby contacting the catalyst with steam and shortstopping the reaction; and recovering polymer which is in the form of substantially a uniform crumb.

2. In a process for preparing rubbery polymers of conjugated dienes containing from 4 to 10, inclusive, carbon atoms in which a conjugated diene is contacted in a reaction zone in the absence of a diluent with a catalyst selected from the group consisting of (1) a compound corresponding to the formula $RLi_x$ wherein R is a hydrocarbon radical selected from the group consisting of aliphatic, cycloaliphatic, and aromatic radicals, and $x$ is an integer from 1 to 4, inclusive, and (2) mixtures obtained by mixing at least two essential components, one of said components being selected from the group consisting of metal hydrides and organometals and the other component being a metal compound selected from the groups consisting of the Group IV, V, VI, and VIII metal compounds, the improvement which comprises withdrawing from said reaction zone a concentrated solution of polymer containing from 10 to 50 percent polymer; subjecting said concentrated solution of polymer to a rapidly pulsating pressure directed in the direction of the passage of said solution from said reaction zone; breaking apart the concentrated highly viscous polymer into discrete polymer particles by sparging the said polymer solution into a steam flash zone; subjecting the polymer particles to steam in said steam flashing zone whereby the unreacted diene is flashed from said polymer and the catalyst is deactivated; said rapidly pulsating pressure being at a frequency sufficient to reduce the size of particles formed in said flash zone below that which would result in the absence of said rapidly pulsating pressure; removing a slurry of rubber crumb in water from the steam flashing zone, separating the water from said crumb, and recovering a polymer which is in the form of substantially a uniform crumb.

3. A process according to claim 2 in which the conjugated diene is 1,3-butadiene.

4. A process according to claim 2 in which said conjugated diene is isoprene.

5. A process according to claim 3 in which said catalyst comprises butyllithium.

6. A process according to claim 2 in which an antioxidant is added to said concentrated polymer solution prior to its introduction into said steam flashing zone.

7. A process according to claim 2 in which the concentrated highly viscous polymer solution is subjected to a rapidly pulsating pressure at a frequency in the range of from 50 to 10,000 cycles per minute.

8. A process according to claim 2 in which the said catalyst is an organoaluminum compound and a Group IV metal halide.

References Cited

UNITED STATES PATENTS

| 2,913,344 | 11/1959 | Stallings | 260—94.7 |
| 3,036,056 | 5/1962 | Rion | 260—94.7 |
| 3,036,057 | 5/1962 | Wallace | 260—94.9 |
| 3,081,290 | 3/1963 | Cottle | 260—94.9 |

FOREIGN PATENTS

| 658,550 | 2/1963 | Canada. |

JOSEPH L. SCHOFER, *Primary Examiner.*

WILLIAM F. HAMROCK, *Assistant Examiner.*